US012578478B2

(12) United States Patent
Kilian et al.

(10) Patent No.: US 12,578,478 B2
(45) Date of Patent: Mar. 17, 2026

(54) METHOD FOR CHECKING THE INTEGRITY OF GNSS CORRECTION DATA PROVIDED WITHOUT ASSOCIATED INTEGRITY INFORMATION

(71) Applicant: Robert Bosch GmbH, Stuttgart (DE)

(72) Inventors: Dennis Kilian, Flein (DE); Dirk Bosenius, Burgwedel (DE)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 17/757,278

(22) PCT Filed: Nov. 18, 2020

(86) PCT No.: PCT/EP2020/082559
§ 371 (c)(1),
(2) Date: Jun. 13, 2022

(87) PCT Pub. No.: WO2021/129984
PCT Pub. Date: Jul. 1, 2021

(65) Prior Publication Data
US 2023/0003897 A1 Jan. 5, 2023

(30) Foreign Application Priority Data
Dec. 23, 2019 (DE) ..................... 10 2019 220 543.7

(51) Int. Cl.
G01S 19/07 (2010.01)
G01S 19/08 (2010.01)
(52) U.S. Cl.
CPC .............. G01S 19/07 (2013.01); G01S 19/08 (2013.01)

(58) Field of Classification Search
CPC .................................. G01S 19/08; G01S 19/07
See application file for complete search history.

(56) References Cited

U.S. PATENT DOCUMENTS 7,924,221 B2 * 4/2011 Trautenberg ............ G01S 19/20
342/357.45
11,226,416 B1 * 1/2022 Pullen ..................... G01S 19/10
(Continued)

FOREIGN PATENT DOCUMENTS

CN 110161535 A 8/2019
JP 2016-206184 A 12/2016
(Continued)

OTHER PUBLICATIONS

Masakazu et al., "The operation and evaluation status of the QZSS Centi-meter Level Augmentation Service", Proceedings of the 2019 IEICE Communications Society Conference, Jan. 27, 2019, pp. 64-65, vol. 1, Japan (6 pages).
(Continued)

*Primary Examiner* — Andrea C Leggett
(74) *Attorney, Agent, or Firm* — Maginot, Moore & Beck LLP

(57) ABSTRACT

The disclosure relates to a method for checking the integrity of GNSS correction data, comprising at least the following steps: a) receiving GNSS correction data, which are provided without associated integrity information, b) receiving reference data which allow for a conclusion to be drawn in respect of the integrity of the GNSS correction data received in step a), and c) checking the integrity of the GNSS correction data received in step a) by means of the reference data received in step b).

7 Claims, 2 Drawing Sheets

(56) References Cited

U.S. PATENT DOCUMENTS

| 2004/0088111 | A1  |   | 5/2004  | Ahlbrecht et al. |               |
|--------------|-----|---|---------|------------------|---------------|
| 2014/0062765 | A1  | * | 3/2014  | Brenner          | G01S 19/15    |
|              |     |   |         |                  | 342/357.3     |
| 2019/0250278 | A1  |   | 8/2019  | Huck et al.      |               |
| 2019/0268906 | A1  | * | 8/2019  | Perdomo          | G01S 19/13    |
| 2020/0156633 | A1  | * | 5/2020  | Stephan          | B60W 30/165   |
| 2021/0033735 | A1  | * | 2/2021  | Kleeman          | G01S 19/07    |
| 2021/0116579 | A1  | * | 4/2021  | Rezaei           | G01S 19/25    |

FOREIGN PATENT DOCUMENTS

| JP | 2019-138911 | A | 8/2019  |
|----|-------------|---|---------|
| JP | 2019-194590 | A | 11/2019 |

OTHER PUBLICATIONS

International Search Report corresponding to PCT Application No. PCT/EP2020/082559, mailed Feb. 1, 2021 (German and English language document) (5 pages).

Ober et al., "RSIM-Based Integrity Monitoring for DGNSS", NTM 2002, Proceedings of The 2002 National Technical Meeting of the Institute of Navigation, the Institute of Navigation, Jan. 30, 2002 (Jan. 30, 2002), pp. 467-473, XP056004718.

D'Angelo Paolo et al., "GNSS Multi-System Integrity Algorithm Definition and Evaluation", GNSS 2007—Proceedings of the 20th International Technical Meeting of the Satellite Division of the Institute of Navigation (Ion GNSS 2007), The Institute of Navigation, Sep. 28, 2007 (Sep. 28, 2007), pp. 3057-3063, XP056010190.

Su H., "Predication of SBAS Integrity Performance using PORIMA Algorithm", GNSS 2010, Proceedings of The 23rd International Technical Meeting of the Satellite Division of the Institute of Navigation (Ion GNSS 2010), The Institute of Navigation, Sep. 24, 2010 (Sep. 24, 2010), pp. 2056-2063, XP056000316.

* cited by examiner

METHOD FOR CHECKING THE INTEGRITY OF GNSS CORRECTION DATA PROVIDED WITHOUT ASSOCIATED INTEGRITY INFORMATION

This application is a 35 U.S.C. § 371 National Stage Application of PCT/EP2020/082559, filed on Nov. 18, 2020, which claims the benefit of priority to Serial No. DE 10 2019 220 543.7, filed on Dec. 23, 2019 in Germany, the disclosures of which are incorporated herein by reference in their entirety.

The disclosure relates to a method for checking the integrity of GNSS correction data, a method for providing integrity data, a method for providing GNSS correction data, a computer program, and a machine-readable storage medium. The disclosure is particularly applicable in connection with autonomous driving. In addition, the disclosure can also be used in other safety-related applications in the field of satellite positioning.

BACKGROUND

GNSS (Global Navigation Satellite System) navigation typically uses GNSS correction data to account for detectable errors in a GNSS signal during localization. The detectable errors can be runtime errors in the GNSS signal, for example. Such a runtime error can be detected, for example, by receiving a GNSS signal with a reference station, the geodetic position of which is precisely known. A correction can then be determined from a comparison of the position calculated by means of the received GNSS signal and the precisely known position. An example of this is so-called DGPS (Differential GPS). GNSS correction data can account for atmospheric effects, environmental effects, clock errors and/or satellite path errors as an alternative or in addition to runtime errors.

The GNSS correction data is usually provided by specialized correction data providers (also known as GNSS correction services). These usually differ in the type of the correction used and in whether or not they also provide the integrity information associated with the GNSS correction data provided. Appropriate information about the integrity of the correction data used or, as appropriate, to be used is, however, particularly important for safety-relevant applications (i.e. applications that require a specific safety level of the data). For example, GNSS positioning of at least partially autonomous vehicles is one area of application where a specific (high) safety level is required.

For example, known GNSS correction services that provide the associated integrity information are commercial PPP-RTK (Precise Point Positioning Real-Time Kinematic) services, in which integrity testing in particular forms part of the proprietary algorithms. This integrity information can be used, for example, to achieve a safety level (in particular according to ISO26262 and/or IEC61508). Appropriate integrity information is important because inconsistent or inaccurate correction data in the position calculation can lead to positioning errors if not detected in time.

Known GNSS correction services that do not provide associated integrity information include services that use PPP (Precise Point Positioning) or PPP-RTK technology, and free or non-commercial services, as well as commercial services. In addition to the names PPP and PPP-RTK, SSR (1 to 4) and other proprietary service provider names to describe the technology are also common. The position correction systems currently available on the market (including those used for data generation, transmission and processing) which do not provide associated integrity information, often do not currently meet the requirements for use in safety-relevant applications such as autonomous driving. Extending the applicability of corresponding correction data to include safety-relevant applications would increase the range of available correction data for safety-relevant applications.

SUMMARY

A method according to the disclosure for checking the integrity of GNSS correction data is proposed here, comprising at least the following steps:

a) receiving GNSS correction data which are provided without associated integrity information, b) receiving reference data which allow for a conclusion to be drawn as to the integrity of the GNSS correction data received in step a), c) checking the integrity of the GNSS correction data received in step a) by means of the reference data received in step b).

In particular, the method is used to verify the integrity of GNSS correction data that were originally provided by the correction data provider which provides (these) GNSS correction data without any associated integrity information or integrity data. The integrity of these (originally unverified) GNSS correction data thus determined can be provided to a GNSS receiver that receives these GNSS correction data. However, it is also conceivable that the integrity checking is carried out at the receiver end. The integrity determined externally or at the receiver end can be used, for example, to achieve a (pre-)defined safety level (e.g. ASIL, SIL), by either using or not using the verified correction data.

DETAILED DESCRIPTION

The integrity of the GNSS correction data usually describes the accuracy, quality, and/or consistency of these GNSS correction data. During the integrity check, the GNSS correction data are thus verified in particular with regard to accuracy, quality, plausibility, and/or consistency.

Step a) involves receiving GNSS correction data which are provided without any associated integrity information. In other words, this applies in particular to GNSS correction data provided by the correction data provider providing (these) GNSS correction data without any associated integrity information or data. In particular, these GNSS correction data do not include any (additional) data describing the accuracy, quality, plausibility and/or consistency of the actual correction data. This means that these GNSS correction data (as such) do not allow in particular any conclusion to be drawn as to whether they represent a (pre-)defined safety level or quality level (e.g. SIL, ASIL) or not. The GNSS correction data are received in step a), in particular from a (mobile) GNSS receiver (itself) or from a higher-level evaluation system such as a data center. The GNSS correction data (correction data of the service to be checked) are preferably received in step a) via IP (Internet Protocol, e.g. TCP/IP or UDP), L-band, or other signal paths.

In step b), reference data are received which allow a conclusion to be drawn as to the integrity of the GNSS correction data received in step a). The reference data may be, for example, orbit data, GNSS correction data provided with associated integrity information, and/or GNSS correction data provided by a correction data provider that differs from the correction data provider providing the GNSS correction data received in step a). In step b), the reference data are received in particular from a (mobile) GNSS receiver (itself) or from a higher-level evaluation system, such as a data center. For example, the reference data can be provided by a GNSS reference base station.

In step c) the integrity of the GNSS correction data received in step a) is checked with the reference data received in step b). In particular, in step c) the accuracy, quality, plausibility and/or consistency of the GNSS correction data received in step a) are determined using the reference data received in step b). To check the integrity of the correction data, it is preferable to compare the quality of the corrections for satellite orbit and/or satellite clock, in particular within previously defined thresholds. Typically, target values for the integrity checking are (pre-)determined. For example, if the (pre-)determined target values are met, the integrity check is set to "positive". Alternatively or in addition, a quality indicator can be calculated which reflects the deviation of the received correction data from the reference data.

The check according to step c) can be carried out, for example, by a (mobile) GNSS receiver (itself) or by a higher-level evaluation system, such as a data center. Furthermore, on the basis of the checking procedure, in particular depending on the result of the checking procedure, integrity information about the GNSS correction data received in step a) can be generated and, if necessary, provided. The integrity information may comprise or describe the calculated quality indicator. The integrity information and/or the quality indicator can be assigned as integrity data to the corresponding GNSS correction data and/or provided (together with or separately from the corresponding GNSS correction data, as appropriate) as integrity data to the GNSS correction data. The integrity information and/or the quality indicator can, for example, allow a conclusion to be drawn as to whether the GNSS correction data meet a (pre-) determined quality level.

The result of the integrity check (of the data for one or more services) can be provided (if necessary, uniformly) via IP and, if necessary, also via other signal paths such as geostationary satellites (L-band) or digital radio (e.g. Sirius XM, DAB). Furthermore, an integrity message can also be generated with results for one or more, preferably all, monitored services. For example, the integrity of GNSS correction data from different providers can be checked using the method. In this context, for example, in step a), GNSS correction data that are provided without associated integrity information can be received from a plurality of (different) services.

According to an advantageous embodiment, it is proposed that the GNSS correction data received in step a) are provided by (at least) one correction data provider that does not perform an integrity check and/or does not provide integrity information for the GNSS correction data.

For example, the correction provider that does not perform an integrity check and/or does not provide integrity information for the GNSS correction data may be a PPP service and/or a PPP-RTK service. In particular, the correction data provider that does not perform an integrity check and/or does not provide integrity information for the GNSS correction data is a non-commercial correction data provider.

According to a further advantageous embodiment it is proposed that the reference data received in step b) comprise orbit data and/or satellite clock data, and/or (where available) regional and/or global corrections for ionosphere and/or troposphere. For example, the orbit data (for checking)

can be the predicted portion of the Ultra Rapid Orbits of the IGS (International GNSS Service).

According to another advantageous embodiment, it is proposed that the reference data received in step b) comprise GNSS correction data which are provided with associated integrity information.

The associated integrity information preferably allows a conclusion to be drawn as to whether the GNSS correction data meet a (pre-)determined quality level (e.g. SIL, ASIL) or not. The correction data provider that provides the GNSS correction data with associated integrity information is usually a commercial correction data provider.

According to another advantageous embodiment, it is proposed that the reference data received in step b) comprise GNSS correction data provided by a (different) correction data provider that is different from the correction data provider that provides the GNSS correction data received in step a).

The other correction data provider may be a correction provider that does not perform an integrity check and/or does not provide integrity information for the GNSS correction data. Even the (pure) GNSS correction data of another correction data provider can in this context (in particular after a comparison) enable a conclusion to be drawn as to the integrity of the correction data received in step a).

By using two services without integrity checking (one of which serves as a reference product), an ASIL-A according to ISO26262 or an SIL1 according to IEC61508 can already be achieved in an advantageous way. By including a service with an integrity check (e.g. with ASIL rating) as a reference product, an ASIL-B or higher can be achieved in an advantageous way (in certain constellations).

According to a further advantageous embodiment, it is proposed that the check in step c) comprises comparing, validating, and/or merging the GNSS correction data received in step a) with the reference data received in step b).

In particular, if in step b) GNSS correction data are received from another correction data provider as reference data, in step c) a comparison and/or validation of the GNSS correction data received in step a) with the reference data received in step b) can be performed. In particular, if GNSS correction data provided with associated integrity information are received in step b), in step c) the GNSS correction data received in step a) can be compared, validated and/or merged with the reference data received in step b).

According to a further aspect a method is proposed for providing integrity data for GNSS correction data which are provided without any associated integrity information, in which a method for integrity checking described here is carried out to determine the integrity data. In particular, the integrity data thus determined can be assigned to the corresponding GNSS correction data that were (originally) provided without associated integrity information. For example, the integrity data can be transmitted to a (mobile) GNSS receiver. In particular, the integrity data allow conclusions to be drawn as to whether the GNSS correction data to which they are assigned meet a (pre-)determined quality level (e.g. ASIL, SIL).

According to a further aspect a method is proposed for providing GNSS correction data to a (mobile) GNSS receiver, in which a method described here for integrity checking and/or a method described here for providing integrity data is carried out. In particular, the GNSS correction data that were (originally) provided without associated integrity information can be provided together with the identified integrity data assigned to them. This can be carried out, for example, in a data stream in which the GNSS correction data and the associated integrity data are merged, for example, into data pairs. However, it is also possible that the GNSS correction data and the associated integrity data are transmitted to the GNSS receiver via separate paths. The GNSS receiver can be arranged in or on a (motor) vehicle, which is preferably configured for at least partially automated or autonomous driving operation.

According to a further aspect, a computer program for carrying out a method presented here is also proposed. In other words, this relates in particular to a computer program (product), comprising commands which during the execution of the program by a computer, cause it to execute a method described here.

According to a further aspect, a machine-readable data medium is also proposed, on which the computer program is stored. Typically, the machine-readable storage medium is a computer-readable data carrier.

The details, features and advantageous embodiments discussed in connection with the method for integrity testing of GNSS correction data can accordingly also occur in the method presented here for providing integrity data, the method for providing GNSS correction data, the computer program and/or the storage medium, and vice versa. In this respect reference is made to the comments made there for further characterization of the features in their full extent.

BRIEF DESCRIPTION OF THE DRAWINGS

The solution presented here as well as its technical background will be explained in more detail below on the basis of the figures. It should be noted that the disclosure is not intended to be limited by the exemplary embodiments. In particular, unless explicitly indicated otherwise, it is also possible to extract partial aspects of the facts explained in the figures and to combine them with other components and/or information from other figures and/or the present description. In the drawings, schematically in each case:

FIG. 1 shows a schematic graphic illustration of the provision of GNSS correction data 1 according to the prior art. Three GNSS satellites of different constellations 7 are shown, a correction data provider 4 receiving the signals of the GNSS satellite 7 that receives the signals at a known geodetic position, and a mobile GNSS receiver 6 that also receives the signals of the GNSS satellite 7. The correction data provider 4 determines GNSS correction data 1 from the received signals, for example by comparing it with the known geodetic position.

In addition, this correction data provider 4 determines, for example, the integrity information associated with the GNSS correction data 1 provided by it and generates integrity data 5 from this information. The correction data provider 4 provides the GNSS correction data 1 in combination with the associated integrity data 5 to the GNSS receiver 6. This means that the GNSS receiver 6, which can be, for example, a GNSS receiver 6 of a vehicle that is driven at least partially autonomously, can detect from the integrity data 5 whether the GNSS correction data 1 provided meet a specific safety level (here an ASIL requirement, for example). If this is the case, the GNSS receiver 6 can correct the received GNSS signals with the GNSS correction data 1 and thus (reliably) improve its self-localization. In principle, the ASIL requirement can also be met if, for example, the integrity information is not available. If the integrity information is not available for checking, the data are usually classified as unverified and can therefore be deemed to be unsafe. The ASIL classification describes in particular a known design with, for example, different redundancies and checking modules that have been developed in accordance with corresponding process requirements.

Figure 1:
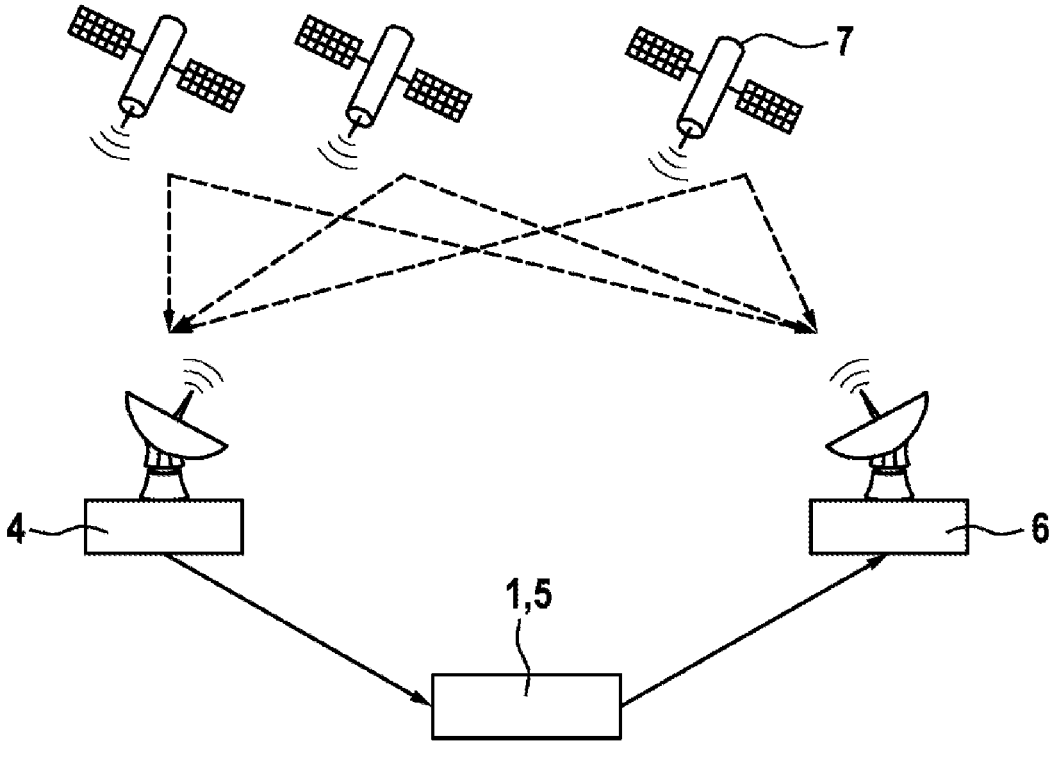
FIG. 1 shows an example graphic illustration of the provision of GNSS correction data according to the prior art.
Figure 2:
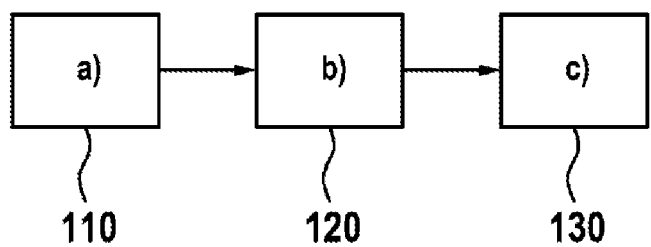
FIG. 2 shows a flowchart of the method presented here for checking the integrity of GNSS correction data.

FIG. 2 schematically shows a flowchart of the method presented here for checking the integrity of GNSS correction data 1. The steps a), b) and c) shown with blocks 110, 120 and 130 can be executed at least once in the sequence. In addition, at least the steps a) and b) can also be carried out at least partially in parallel or simultaneously. In block 110, according to step a), GNSS correction data 1 are received, which are provided without corresponding integrity information. In block 120, in accordance with step b) reference data 2 are received, which allow a conclusion to be drawn as to the integrity of the GNSS correction data 1 received in step a). In block 130, in accordance with step c) the integrity of the GNSS correction data received in step a) is checked with the reference data 2 received in step b).

Figures 3, 4:
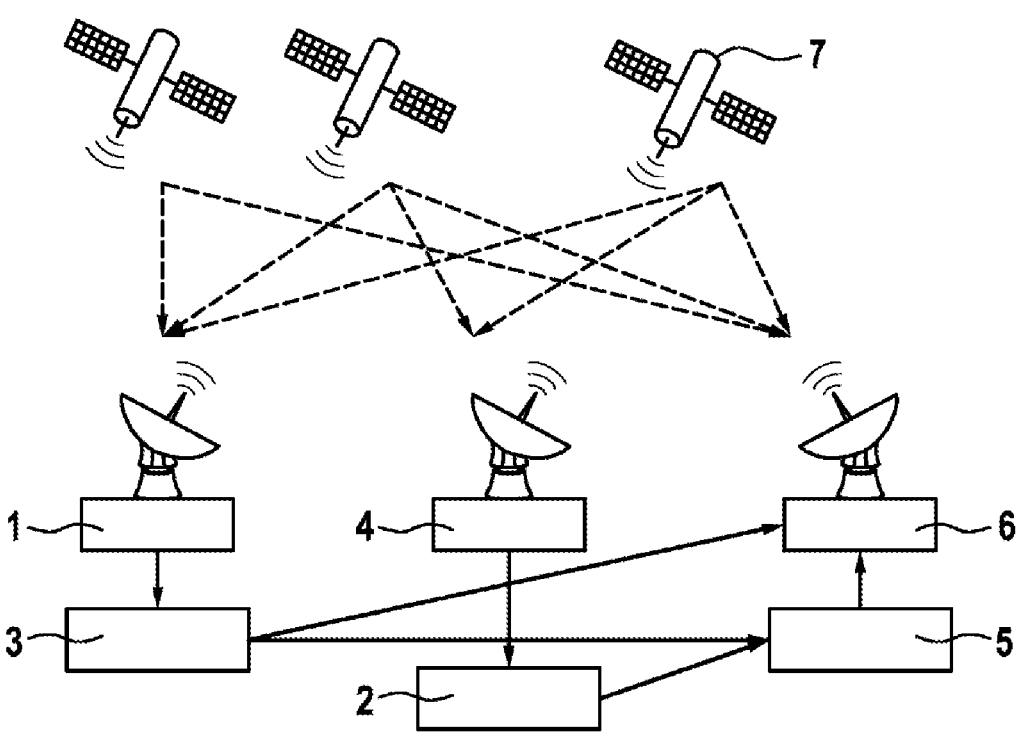
FIG. 3 shows an exemplary graphic illustration of the method presented here for providing GNSS correction data to a GNSS receiver.
FIG. 4 shows an exemplary flow diagram of the method presented here for providing GNSS correction data to a GNSS receiver.

FIG. 3 shows a schematic of an exemplary graphic illustration of the method presented here for providing GNSS correction data 1 to a (mobile) GNSS receiver 6. A method for integrity checking described here is performed. In this context, integrity data 5 are also provided to the GNSS receiver 6. The integrity data 5 are provided for the GNSS correction data 1, which are provided (by the providing correction data provider 3) without associated integrity information. A method described here for integrity checking is carried out to determine the integrity data 5. In this regard, reference is made to the explanations given for FIG. 2.

In FIG. 3 the GNSS correction data 1 received in step a) are provided by a correction data provider 3 which does not carry out an integrity check and/or offers no (associated) integrity information for the GNSS correction data 1. These GNSS correction data 1 are also provided (without integrity information or directly) to a GNSS receiver 6. This GNSS receiver 6 is also provided with (and independently of or in parallel) the integrity data 5 for the GNSS correction data 1 that are determined in accordance with the integrity checking method described here. This allows the GNSS receiver 6 to check whether the GNSS correction data 1 meet a certain (specified) safety level or not.

The reference data 2 received in step b) here comprise, for example, GNSS correction data that are provided by a correction data provider 4 which differs from the correction data provider 3 that provides the GNSS correction data 1 received in step a). Furthermore, as an example, the reference data 2 received in step b) here comprise GNSS correction data which are provided with associated integrity information.

Alternatively or in addition, the received reference data 2 may be GNSS correction data that are provided without any associated integrity information but by a correction data provider 4 which is different from the correction data provider 3 which provides the GNSS correction data 1 received in step a). Furthermore, the reference data 2 received in step b) may additionally or alternatively comprise orbit data, satellite clock data, regional and/or global corrections for ionosphere and/or troposphere.

For example, the checking in step c) comprises comparing and/or merging the GNSS correction data 1 received in step a) with the reference data 2 received in step b). A more detailed example of this is described below in conjunction with FIG. 4.

FIG. 4 shows a schematic of an exemplary flowchart of the method presented here for providing GNSS correction data 1 to a GNSS receiver 6. The data provided by various correction data providers 3, 4 are subjected to an input check 10 with regard to value range, completeness, and/or topicality. Various auxiliary data 8, 9 can also be taken into account. The auxiliary data can be, for example, orbit data of the IGS (International GNSS Service) and/or the CODE (Center of Orbit Determination Europe). But the use of global tropospheric models (e.g. UNB3 from the University of New Brunswick) and/or global ionosphere models (such as Ionosphere Maps) are also conceivable for plausibility checking. This is followed by a time synchronization 11 of the data. The data are checked for plausibility and/or normalized as part of a normalization and/or plausibility check 12 with regard to the data features (example: relative correction parameters are converted to absolute correction parameters using the broadcast ephemeris values).

According to the specified parameters, the correction data and any auxiliary data (from the normalization and/or plausibility check 12) are compared with each other in a comparison 13. The comparison result is re-used as part of a selection 4. Individual data elements, data attributes or complete data streams are discarded or forwarded based on the comparison results from the comparison 13. In the last (assembly) step 15, selected correction and auxiliary data from the selection 14 are assembled in a new correction data stream. The correction data stream contains the GNSS correction data 1 and the integrity data 5 for these correction data 1.

In particular, the methods presented here allow the advantage that GNSS correction data provided without corresponding integrity information can also be used in connection with at least partially autonomous driving, which usually places high demands on the integrity of the data used.

The invention claimed is:

1. A method for operating an autonomous vehicle, the method comprising:

receiving, with a mobile GNSS receiver, GNSS signals from a satellite;

checking an integrity of first GNSS correction data by a) receiving the first GNSS correction data from a precise point positioning (PPP) service provider that is remote from the autonomous vehicle, the first GNSS correction data being provided without associated integrity information, b) receiving second GNSS correction data from a precise point positioning real-time kinematic (PPP-RTK) service provider that is remote from the autonomous vehicle, the second GNSS correction data being provided with associated integrity information, and c) checking the integrity of the first GNSS correction data by determining a deviation of the first GNSS correction data from the second GNSS correction data;

determining corrected GNSS signals by correcting the GNSS signals using the first GNSS correction data;

determining a position of the autonomous vehicle using the corrected GNSS signals; and performing at least one operation of the autonomous vehicle using the determined position, wherein the first GNSS correction data and the second GNSS correction data each account for errors in the GNSS signals resulting from at least one of atmospheric effects, environmental effects, clock errors, or satellite path errors.

2. The method as claimed in claim 1, wherein the precise point positioning (PPP) service provider at least one of (i) does not carry out an integrity check and (ii) offers no integrity information for the first GNSS correction data.

3. The method as claimed in claim 1, wherein the c) checking further includes at least one of a comparison, a validation, and a merging of the first GNSS correction data with the second GNSS correction data.

4. The method according to claim 1, wherein the method is carried out by a computer program.

5. The method according to claim 4, wherein the computer program is stored on a non-transitory machine-readable storage medium.

6. A method for operating an autonomous vehicle, the method comprising:

receiving, with a mobile GNSS receiver, GNSS signals from a satellite;

determining integrity data for first GNSS correction data by a) receiving the first GNSS correction data from a precise point positioning (PPP) service provider that is remote from the autonomous vehicle, the first GNSS correction data being provided without associated integrity information, b) receiving second GNSS correction data from a precise point positioning real-time kinematic (PPP-RTK) service provider that is remote from the autonomous vehicle, the second GNSS correction data being provided with associated integrity information, and c) checking the integrity of the first GNSS correction data by determining a deviation of the first GNSS correction data from the second GNSS correction data;

providing the integrity data for the first GNSS correction data;

determining corrected GNSS signals by correcting the GNSS signals using the first GNSS correction data;

determining a position of the autonomous vehicle using the corrected GNSS signals; and performing at least one operation of the autonomous vehicle using the determined position, wherein the first GNSS correction data and the second GNSS correction data each account for errors in the GNSS signals resulting from at least one of atmospheric effects, environmental effects, clock errors, or satellite path errors.

7. A method for operating an autonomous vehicle, the method comprising:

receiving, with a mobile GNSS receiver, GNSS signals from a satellite;

at least one of checking an integrity of first GNSS correction data and determining integrity data for the first GNSS correction data by a) receiving the first GNSS correction data from a precise point positioning (PPP) service provider that is remote from the autonomous vehicle, the first GNSS correction data being provided without associated integrity information, b) receiving second GNSS correction data from a precise point positioning real-time kinematic (PPP-RTK) service provider that is remote from the autonomous vehicle, the second GNSS correction data being provided with associated integrity information, and c) checking the integrity of the first GNSS correction data by determining a deviation of the first GNSS correction data from the second GNSS correction data;

providing the first GNSS correction data to a GNSS receiver of the autonomous vehicle;

determining corrected GNSS signals by correcting the GNSS signals using the first GNSS correction data;

determining a position of the autonomous vehicle using the corrected GNSS signals; and performing at least one operation of the autonomous vehicle using the determined position, wherein the first GNSS correction data and the second GNSS correction data each account for errors in the GNSS signals resulting from at least one of atmospheric effects, environmental effects, clock errors, or satellite path errors.

* * * * *